UNITED STATES PATENT OFFICE.

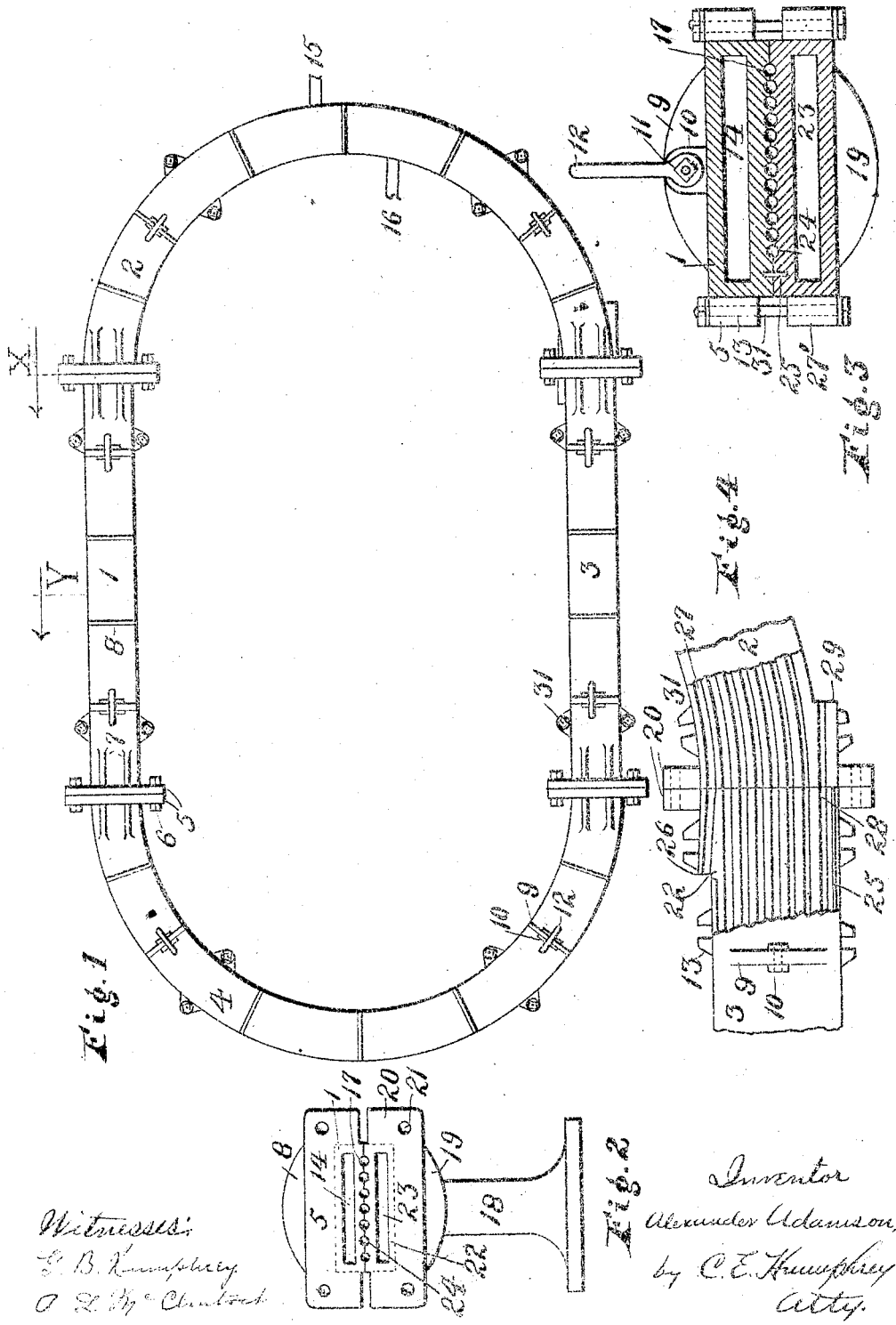

ALEXANDER ADAMSON, OF AKRON, OHIO.

VULCANIZING-MOLD.

1,037,187.  Specification of Letters Patent.  Patented Sept. 3, 1912.

Application filed October 9, 1911. Serial No. 653,668.

*To all whom it may concern:*

Be it known that I, ALEXANDER ADAMSON, a citizen of the United States, residing at Akron, in the county of Summit and State of Ohio, have invented new and useful Improvements in Vulcanizing-Molds, of which the following is a specification.

This invention relates to vulcanizers for vulcanizing long lengths of hose, tubing, elastic tires, and the like.

Heretofore, such articles as hose, tires, etc., have been, in a large measure, vulcanized in short standard lengths and shipped to the retail dealer and by him sold to the trade, but experience has shown that, where such articles as rubber tires, which are usually vulcanized in approximately fifteen-foot lengths, are sent to the retail dealer there is a considerable waste due to the fact that the lengths required by the purchaser will not be equal in many instances to the standard length of the tire and hence, the surplus is waste, thereby causing a loss either to the dealer or the purchaser.

The object of this invention therefore, is to provide a suitable vulcanizer for manufacturing articles in continuous lengths, such as five hundred to one thousand feet, of tubing, hose, or rubber tires at one operation, and which can, after being made, be reeled up and shipped to the dealer and short lengths be cut or severed for the retail trade, thereby eliminating the waste due to the manufacture of the lengths heretofore used. I attain this object by providing a vulcanizer provided with a spirally-arranged groove in which comparatively long lengths of rubber articles can be effectually vulcanized without employing an unnecessarily large or cumbersome device for the purpose.

With the foregoing and other objects in view, the invention consists in the novel construction, combination and arrangement of parts constituting the invention to be hereinafter specifically described and illustrated in the accompanying drawings which form a part hereof, wherein is shown the preferred embodiment of the invention, but it is to be understood that changes, variations and modifications can be resorted to which come within the scope of the claim hereunto appended.

In the drawings in which similar reference numerals indicate like parts in the different figures, Figure 1, is a plan of a vulcanizer embodying this invention; Fig. 2, is a sectional view on line X of Fig. 1; Fig. 3, is a similar view on line Y of Fig. 1; and, Fig. 4, is a plan view enlarged of a portion of the vulcanizer with parts thereof broken away to more fully illustrate the invention.

The invention embodies a plurality of pairs of upper and lower mold-sections adapted to be abutted together to form an endless vulcanizer, and in the drawings the reference numerals 1, 2, 3 and 4 denote the upper mold-sections each of which are provided at their ends with flaring flanges 5, the flanges of contiguous sections arranged to be clamped together by clamping-bolts 6, so that the entire upper half of the vulcanizer is united and may be raised or lowered as a unitary structure. The end flanges 5 are preferably stiffened by means of webs 7 and the sections are further strengthened by upwardly-extending flanges 8 arranged at intervals. At suitable points on the upper face of the mold-sections 1-4 inclusive, are upwardly-extending apertured flanges 9 provided with strengthening bosses 10 to which are secured by means of hold-fast devices 11 lifting links 12 by which suitable tackle may be connected with the upper half of the vulcanizer for raising and lowering the same. The upper mold-sections are also provided with a plurality of pairs of laterally-extending lugs 13 spaced from each other to provide between them openings to receive clamping-bolts, and it may be stated that while only a few of these pairs of lugs are shown, the number of pairs of lugs may be increased as desired. The interiors of each of the sections 1-4 inclusive, are provided with cavities or openings forming steam-chambers 14, and the cavity in one section may be connected with the cavity in another section, that is to say, the entire cavity in the upper half of the vulcanizer may be continuous and heated by an inlet-pipe 15 and drained by an outlet-pipe 16, or each section may be provided with its respective inlet and drain-pipe, in the latter case, the ends of the mold-sections shown in Fig. 2 will be closed instead of open. In the lower face of the mold-sections 1-4 inclusive, are a plurality of longitudinal grooves 17, a more particular description of which will hereinafter appear.

Below the upper portion of the vulcanizer composed of the members 1–4 inclusive. are the lower or complementary members 22 of the device which are usually supported by legs 18, and each embodies a mold-section corresponding in contour with its respective superposed upper section, and the lower sections are also provided with strengthening flanges 19 similar to the flanges 8. At both ends of the lower sections are flanges 20, the flanges of contiguous sections adapted to be clamped together by clamping-bolts passed through suitable apertures 21 therein in the same manner as has been described with respect to the upper mold-members. The interior of each of the lower mold-sections 22 are provided with openings constituting steam-chambers 23 similar in all respects to the steam-chambers 14 in the upper members of the mold, and the chambers in coadjacent sections may communicate so as to make a continuous opening throughout the lower portion of the vulcanizer or each may be supplied separately with a heating medium such as steam and also provided with a drainage-tube to carry away the products of condensation. The upper faces of the lower mold-sections are provided with longitudinal grooves 24 to register with the complementary grooves 17 in the upper section to form continuous mold-cavities. The upper portion of the vulcanizer is adapted to be brought into registering relation with respect to the lower portion when lowered to position, by means of dowel-forming elements 25 so that when the portions of the vulcanizer are separated and returned to place they will always register with each other.

The mold-cavities formed by the registering grooves 17 and 24 are shaped to impart the desired configuration to the articles to be vulcanized and while the drawings show cylindrical mold-cavities it will be apparent that they may be given any other configuration desired.

At a suitable point, say, for instance, near the joint between the mold-sections 2 and 3, there is provided on the upper mold-section 3 and its complementary lower member laterally-extending lugs 26 provided with a cavity which registers with the mold-cavity 27 in the upper section 2 and its lower member, and this cavity 27 extends around the entire vulcanizer spirally so as to form convolutions which terminate at the point 28 on the opposite side from the lug 26. The upper mold-member 2 and its complementary member are provided with a laterally-extending lug 29 provided with a mold-cavity which communicates with the end 28 of the groove 27. From this it will be seen that from the mold-cavity in the lug 26 and extending throughout the entire contacting faces of the mold-sections is a spirally-arranged groove 27 terminating with the mold-cavity in the lug 26 so as to make a continuous mold-forming opening of great length.

In filling the mold the unvulcanized rubber stock is placed in or started from the mold-cavity in either the lugs 26 or 29 and carried continuously around the vulcanizer in the mold-cavity 27 until it terminates in the cavity in the opposite lug. The upper half of the vulcanizer consisting of the members 1–4 inclusive, is then lowered to position and clamped in position through the medium of clamping-bolts 31 placed in the notches between the pairs of lugs 13, and these bolts also extend through similar notches formed by pairs of lugs 27' in vertical alinement on the lower mold-sections. After vulcanization has taken place the clamping-bolts 31 are removed and the upper half of the vulcanizer raised and the cured article removed.

I claim:

A vulcanizer comprising upper and lower portions each composed of a plurality of separable connected portions, said upper portion movable bodily from said lower portion, the opposing faces of said portions provided with continuous uninterrupted registering grooves arranged in a series of horizontal spirally formed convolutions forming a continuous mold cavity, the termini of said cavity arranged on opposite sides of said convolutions and being open, the grooves lying in a horizontal plane throughout and in the same plane as the open termini.

In testimony whereof I have hereunto set my hand in presence of two subscribing witnesses.

ALEXANDER ADAMSON.

Witnesses:
A. L. McClintock,
C. E. Humphrey.